Patented Nov. 16, 1926.

1,607,299

UNITED STATES PATENT OFFICE.

IWAN OSTROMISLENSKY, OF LOCUST POINT, NEW JERSEY, ASSIGNOR TO OSTRO PRODUCTS CORPORATION OF AMERICA, OF JERSEY CITY, NEW JERSEY, A CORPORATION OF NEW JERSEY.

PROCESS FOR MAKING PARAHYDROXY-METANITRO-PHENYLARSENIOUS ACID.

No Drawing.      Application filed July 22, 1922.   Serial No. 576,882.

This invention relates to processes for making parahydroxy-metanitro-phenylarsenious acid. This substance is of great technical importance as a material which upon reduction is easily and directly converted to dihydroxy-diamino-arsenobenzol, the dihydrochloride of which is known under the trade name of "salvarsan", etc. Just as the synthetic production of indoxyl is equivalent to the synthesis of indigo, so is the synthetic production of parahydroxy-metanitro-phenylarsenious acid equivalent to the synthesis of "salvarsan".

According to the process of Ehrlich and Bertheim for the production of "salvarsan," there are six separate reactions with a relatively small yield (approximately 50% on a laboratory scale) of the final product. The six reactions of the Ehrlich and Bertheim synthesis are as follows:

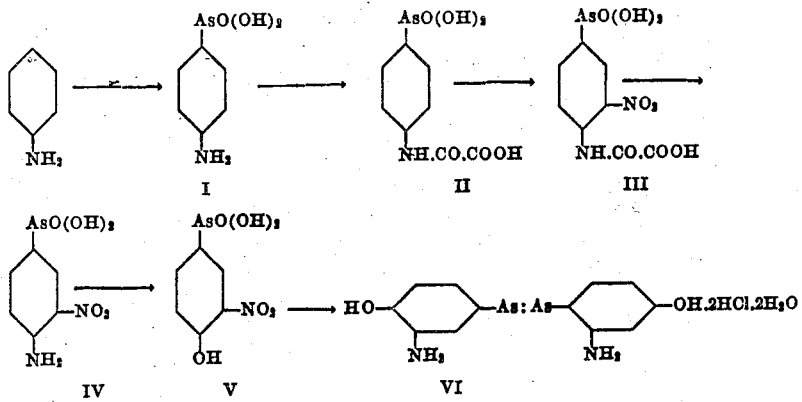

The Ehrlich and Bertheim synthesis therefore requires comparatively large plant facilities and entails large expenditures for power, labor and a considerable variety of raw materials and in addition as mentioned produces a comparatively small yield.

The principal object of the present invention accordingly is to overcome difficulties found in prior processes, such as the Ehrlich and Bertheim process and accordingly to produce a process having relatively few steps requiring comparatively small plant facilities and expenditures for power, labor and raw materials and which shall give a relatively high yield of finished product having equal or greater therapeutic value than "salvarsan" and similar materials heretofore produced. Another object of the invention is to provide a simple, efficient process for purifying, if necessary, the product obtained.

The invention accordingly broadly consists in a process which comprises nitrating diazotized arsanilic acid and recovering parahydroxy-metanitro-phenylarsenious acid. It also includes the purification, if necessary, of the material produced by the process.

*Example 1.*

The following is a preferred example of the process: To a mixture of 250 grams of dry arsanilic acid (or the corresponding quantity of moist arsanilic acid) and 275 cc. of nitric acid, specific gravity 1.3 and 750 cc. of water is added as a single mass 133 grams of sodium nitrite at room temperature. The mixture is shaken until brown fumes of nitric acid appears which usually occurs in about 2 to 3 minutes. The mixture is then heated to about 55-60° C. The heating is then immediately stopped and an exothermic reaction occurs. Care should be taken during the course of this reaction that the temperature does not rise above approximately 70° C. Any rise in temperature above this point may be stopped by the addition of pieces of ice. After the exothermic reaction has taken place and the temperature of the mixture has dropped to about 14-40° C., the reaction mixture is heated for 6 to 9 hrs. under a reflux condenser at a temperature near the boiling point. Upon cooling to room temperature the parahydroxy-metanitro-phenylarsenious acid separates as a heavy yellow or reddish crystalline mass and is filtered by suction using a Buchner funnel. It is washed on the funnel with 100 cc. of cold water. Drying is accomplished in a dry oven in the presence of air if desired at 30–70° C. The yield is approximately 75–85% based on the weight of arsanilic acid taken.

The diazotization and nitration it will be observed in accordance with the above example take place in the same solution. The reaction taking place in accordance with the above procedure may be indicated as follows, the starting point being aniline instead of arsanilic acid:

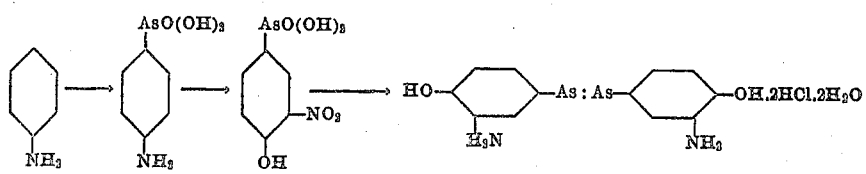

It will be noted that the above reaction takes place in three steps instead of the six separate steps of the Ehrlich and Bertheim reaction. The conversion from aniline into arsanilic acid is carried out by a process described in the literature and the conversion from parahydroxy-metanitro-phenylarsenious acid into "salvarsan" is carried out by a method described in the literature.

The equation for conversion of arsanilic acid into parahydroxy-metanitro-phenylarsenious acid according to the above procedures may be written as follows:

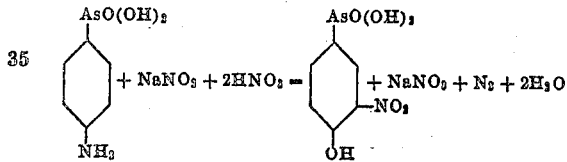

It will be understood that the strength of the nitric acid employed may be varied as desired. Considerably weaker solutions of nitric acid may be used but where such weak solutions are used it is more convenient to reduce the amount of water originally used in the reaction mixture. A slight excess of nitric acid over the calculated quantity required for the reaction should be maintained in the reaction mixture, otherwise strongly colored products are produced with substantially smaller quantities of parahydroxy-metanitro-phenylarsenious acid. That portion of the nitric acid which is used to cause diazotization by liberation of nitrous acid from sodium nitrite may be replaced by other acids, if desired.

Other examples of the process included in the invention are as follows:

*Example 2.*

250 gms. of dry (or the corresponding quantity of moist) arsanilic acid are mixed with 750 cc. of water and 275 cc. of nitric acid specific gravity 1.3. A portion of the acid started with does not dissolve. The mixture is cooled by cold water (occasionally by water and a small quantity of ice), whereupon it usually crystallizes out into a gruel-like mass. The diazotization is performed by a solution of techanical sodium nitrite (i. e. the theoretical quantity of $NaNO_2$) in 150 cc. of water at a temperature of 10°–18°.

Diazotization is controlled by reactive starch potassium iodide paper. The temperature of diazotization may fluctuate within wide limits. When all the nitrite has been added, the reaction mixture containing a small sediment is allowed to stand at a normal temperature from 30 minutes to 1 hour or more. The solution thus obtained is heated in a vessel of large capacity such as a large flask or porcelain dish on a sand bath, using a free flame, until the complete decomposition of the diazo-nitrate is reached. The end of the reaction may be detected by the discontinuance of the evolution of bubbles of nitrogen and its oxides. If the conditions of the decomposition (temperature, evaporation surface of the vessel, etc.) hinder the evaporation, then the solution of the reaction products, after decomposition, is evaporated to about 900 cc. of the total volume.

The decomposed and concentrated solution of the products is allowed to stand for 16 hours at ordinary temperatures. The parahydroxy-metanitro-phenylarsenious acid which by this time has separated out in the form of a heavy yellow or reddish crystalline mass, is filtered by suction. Washing and drying are accomplished as in Example 1. The yield is 200 gms., i. e. 80% calculated on the weight of arsanilic acid started with.

*Example 3.*

A mixture of 500 gram arsanilic acid, 1500 cc. of water, 684 cc. of $HNO_3$ specific gravity 1.3 is heated after its diazotization at 12°–25° (165 gms. $NaNO_2$ dissolved in 300 cc. of water) in a large porcelain cylinder to 70°–80° by means of steam or a water bath for a period of 8–10 hours. The further manipulation of the reaction product is conducted as specified in Example No. 2.

The yield reaches in this case 85%–90% on the weight of the original arsanilic acid.

Example 4.

A solution of 250 gms. of arsanilic acid diazotized according to conditions specified in Examples 2 or 3 is allowed to stand for several weeks at room temperature. Bubbles of molecular nitrogen are constantly evolved. The rate of decomposition is entirely determined by the temperature of the surrounding atmosphere. During the process of reaction the appearance and accumulation of parahydroxy-metanitro-phenylarsenious acid begins. The acid may be obtained either by the usual method of the evaporation of the solution (see above) or else by separating it in the cold in the form of the insoluble calcium salt. This will be described in the following examples.

For purification of the mass of parahydroxy-metanitro-phenylarsenious acid obtained in accordance with any one of the above procedures the following procedures may be carried out: (It will be noted that there may be obtained as by-products of the process orthonitrophenol, 2-4 dinitrophenol, and traces of various colored and tarry substances.)

Example 1.

To 25 grams of crude but dried parahydroxy-metanitro-phenylarsenious acid or to the corresponding quantity of the moist acid obtained as pointed out in the preceding examples, a N/10 solution of caustic soda is added until the reaction is slightly alkaline (almost neutral) to litmus. The solution thus obtained is brought to boiling, and a boiling solution of 33 gms. of calcium chloride in 50 cc. of water is added. The heating of the mixture to 100° is continued for 10–20 minutes. The calcium salt thus precipitated out (colored a pure yellow) is squeezed in a press using a cloth bag and is then washed, while in the press, with 500 cc. of hot water. The fairly well pressed salt thus obtained is mixed with 75 cc. of water, then shaken up and 25 cc. of fuming hydrochloric acid specific gravity 1.19 are added. To the mixture are added about 2 gms. of animal charcoal. The mixture is then boiled until complete solution of the free arsenious acid is obtained. It is then filtered.

The product which crystallizes out upon cooling may be found sufficiently pure. This may be determined by the sodium hydrosulphite reaction (see description above). In this case the product is recrystallized once or twice from 35 cc. of a mixture of methyl alcohol and water (1 vol; 1 vol.) The yield of the chemically pure parahydroxy-metanitro-phenylarsenious acid reaches in this case 75%–85%.

From the cooled mixture of the mother liquor and the washings obtained on pressing the calcium salt, the calcium salt of dinitrophenol crystallizes out in long, beautiful golden-yellow needles which possess a light silky luster and are easily soluble in hot water. In cold water this salt is very slightly soluble.

Example 2.

100 gms. of crude parahydroxy-metanitrophenylarsenious acid obtained as specified in Examples 2–4 are mixed with 150 cc. of cold water. To the mixture thus obtained 150 gms. of solid potassium hydroxide are added. After the solution has been allowed to stand for about one hour, the small amount of yellow precipitate which has separated out meanwhile, is filtered off on a Buchner funnel using mercerized cloth. The filtrate obtained is allowed to stand at ordinary temperature for 16 hours. The abundant precipitate which has separated out is carefully washed in a porcelain dish with 100 cc. of methyl alcohol. Then it is dissolved in 200 cc. of water. The solution is acidified, using 40 cc. of fuming hydrochloric acid specific gravity 1.19, whereupon the precipitated chemically pure snow white parahydroxy-metanitro-phenylarsenious acid which has precipitated out is filtered off and is dried as usual. The yield is about 50 gms., i. e., 50%, calculating on the weight of the original acid.

The purification of the crude parahydroxy-metanitro-phenylarsenious acid is most conveniently performed by means of its sodium salt. In this case some of the by-products of the reaction are also obtained in their pure state.

Example 3.

500 gms. of crude but dried product obtained as specified in Examples 2–4 are dissolved in 1 liter of boiling 15%–16% solution of sodium hydroxide. To the solution while still at a boil are added 500 cc. of ethyl alcohol (95%–98%). Then the heating of the solution is discontinued and into the still hot mixture 500 cc. more of the same alcohol are introduced. Ethyl alcohol denatured by 5% of pure methyl alcohol may be used in this case. The mixture is allowed to stand for about 4 hours at ordinary temperatures. The reddish-orange crystals which have separated out are filtered on a Buchner funnel, pressed well and washed with 100 cc. of a mixture consisting of 50 cc. of the same ethyl alcohol and 50 cc. of water. Then they are pressed once more on the funnel.

The result obtained is a chemically pure crystalline disodium salt of parahydroxy-metanitro-phenylarsenious acid, which is colored orange and has a high index of refraction. This salt may be used for the preparation of "salvarsan" without preliminary conversion into the free arsenious acid.

It is only necessary to filter the solution of this salt to free it from a slight turbidity and foreign matter, such as filter paper, fibres, dust, etc. The drying of the salt may be conducted at ordinary temperatures, using a filter paper which in turn is placed on a cloth stretched over a frame. On heating, the moist salt easily becomes viscous, assuming an intense red coloration.

From the alcoholic filtrate which remains after the main mass of the disodium salt of parahydroxy-metanitro-phenylarsenious acid has been separated out, 850 cc. are distilled over, the orthonitrophenol being carried over by vapors of water and alcohol. From the residue in the distilling flask, after about two hours at ordinary temperatures, the sodium salt of the dinitrophenol separates out. The filtrate from the dinitrophenol is acidified with 100 cc. of fuming hydrochloric acid specific gravity 1.19. The crystalline mass which thus separates out is filtered off on the following day and is dried. This mass represents the crude parahydroxy-metanitro-phenylarsenious acid. The acid is easily purified according to the conditions specified in each of the preceding examples. The yield of this product is 80 gms. The total yield of chemically pure parahydroxy-metanitro-phenylarsenious acid calculating the disodium salt as parahydroxy-metanitro-phenylarsenious acid calculating the disodium salt as parahydroxy-metanitro-phenylarsenious acid is not less than 80%, calculated on the weight of the original crude product.

Each of the examples provides a product sufficiently pure for conversion into salvarsan. The tests for such purity have been determined to be as follows:

The inventor has found that the color of water solutions of the alkali metal salt of chemically pure parahydroxy-metanitro-phenylarsenious acids is in no degree intensified when acted upon by a minute quantity of sodium hydrosulphite ($Na_2S_2O_4$). An intensification of color would prove, in full accordance with the tests of Ehrlich and Bertheim, the presence of dinitrohydroxy-phenylarsenious acid or dinitrophenol.

The inventor has also observed that solutions of the alkali metal salt of the chemically pure acid are almost instantaneously decolorized when an excess of sodium hydrosulphite ($Na_2S_2O_4$) is added. Thus it has been shown that intensification of the color of the above solutions indicates the admixture of one impurity, whereas an increase of the time required for the original color of the solution to disappear indicates still another impurity. A solution of a sample not thoroughly purified may give no intensification of color when a minute quantity of sodium hydrosulphite is added, yet may decolorize only very slowly when an excess is added—in other words, it may be free from dinitrohydroxy-phenylarsenious acid and dinitrophenol, and yet at the same time contain colored substances which are only slowly decolorized by the $Na_2S_2O_4$. Or conditions may be reversed—an intensification of color and an immediate loss of this color, on addition of excess $Na_2S_2O_4$. So sodium hydrosulphite represents an excellent reagent for determining the purity of parahydroxy-metanitro-phenylarsenious acid. It is that acid whose alkali metal salts are instantaneously decolorized by sodium hydrosulphite and do not give under the above mentioned conditions the slightest intensification of coloration which is preferably used for the reduction into salvarsan. An acid which does not satisfy these conditions yields on reduction a preparation more toxic, possessing in addition an abnormal coloration, usually green.

The position of the side chains in the benzene nucleus of this nitrohydroxy-phenylarsenious acid has been definitely proven. There has been substituted for the arsenic group of the acid an atom of iodine, the substitution taking place with the aid of hydriodic acid (a mixture of $KI$ and $H_2SO_4$) under ordinary conditions. During this substitution reaction an iodonitrophenol (80°–81°) was isolated which has not yet been described in the literature. This substance separates out from ether in the form of yellow prismatic needles; from hot water in long, pale yellow needles. These at the beginning separate out in the form of oily drops producing an emulsion. The substance is easily soluble in ether and alcohol, very little in cold, but somewhat more in hot water. If heated in a dry state it evolves vapors of free iodine. The potassium or sodium salt of this substance (ruby-red crystals) may be quickly separated from a water solution by the addition of solid alkali ($KOH$ or $NaOH$).

The iodonitrophenol, isolated by the inventor under the same conditions from parahydroxy-metanitro-phenylarsenious acid when the latter was prepared by the method of Ehrlich and Bertheim, was found to be identical with the iodonitrophenol just mentioned. Indeed, both preparations or a mixture of the two melt at 80°–81° C. Hence, this nitrohydroxy-phenylarsenious acid undoubtedly possesses the following structure:

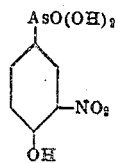

The process described is a simple efficient one and by it the substance parahydroxymetanitro-phenylarsenious acid obtained is the least expensive of any obtained by the various methods heretofore described. As compared with these methods for example Ehrlich and Bertheim method the yields obtained are considerably larger and the steps involved in carrying out the process are reduced approximately 50%. The plant facilities thus required for the production of the material are small as well as the expenditures necessary for power, labor and raw materials. The variety of raw materials employed is also relatively small compared with prior processes.

As many apparently widely different embodiments of the invention may be made without departing from the spirit thereof, it will be understood that I do not intend to limit myself to the specific embodiment herein set forth except as indicated in the appended claims.

Having thus described my invention, what I claim and desire to protect by Letters Patent is:

1. A process of the kind described which comprises nitrating diazotized arsanilic acid, and recovering parahydroxy-metanitro-phenylarsenious acid.

2. A process of the kind described which comprises diazotizing arsanilic acid, nitrating the diazotized arsanilic acid, and recovering parahydroxy-metanitro-phenylarsenious acid.

3. A process of the kind described which comprises diazotizing arsanilic acid in the presence of water at a temperature below approximately 70° C., nitrating the diazotized arsanilic acid at a temperature below the boiling point of the mixture and recovering parahydroxy-metanitro-phenylarsenious acid.

4. A process of the kind described which comprises nitrating diazotized arsanilic acid in the presence of water at a temperature below the boiling point of the reaction mixture, and recovering parahydroxy-metanitro-phenylarsenious acid.

5. A process of the kind described which comprises mixing arsanilic acid, nitrous acid and nitric acid, causing diazotization and nitration to occur in the same solution, and recovering parahydroxy-metanitro-phenylarsenious acid.

6. A process of the kind described which comprises mixing arsanilic acid, nitrous acid and nitric acid, causing diazotization to occur at a temperature below approximately 70° C., heating the mixture to a point just below its boiling point, maintaining its temperature approximately at such point for six to nine hours, and recovering parahydroxy-metanitro-phenylarsenious acid.

7. A process of the kind described which comprises preparing a mixture of arsanilic acid, nitric acid and sodium nitrite for producing nitrous acid, heating the mixture to its boiling point, allowing an exothermic reaction to complete itself substantially at a temperature below approximately 70° C., heating the mixture thus treated to a point approximating its boiling point for six to nine hours, and recovering parahydroxy-metanitro-phenylarsenious acid.

8. A process of the kind described which comprises nitrating diazotized arsanilic acid, and converting the parahydroxy-metanitro-phenylarsenious acid into a salt.

9. A process of the kind described which comprises nitrating the diazotized arsanilic acid, converting the parahydroxy-metanitro-phenylarsenious acid into a salt, and recovering pure hydroxy-metanitro-phenylarsenious acid therefrom.

10. A process of the kind described which comprises diazotizing arsanilic acid in the presence of water at a temperature below approximately 70° C., nitrating the diazotized arsanilic acid at a temperature below the boiling point of the mixture, adding an alkali, and recovering the alkali metal salt of parahydroxy-metanitro-phenylarsenious acid.

11. A process of the kind described which comprises diazotizing arsanilic acid in the presence of water at a temperature below approximately 70° C., nitrating the diazotized arsanilic acid at a temperature below the boiling point of the mixture, adding an alkali, recovering the alkali metal salt of parahydroxy-metanitro-phenylarsenious acid, and converting the alkali metal salt by addition of an acid into parahydroxy-metanitro-phenylarsenious acid.

12. A process of the kind described which comprises mixing arsanilic acid, nitrous acid and nitric acid, causing diazotization to occur at a temperature below approximately 70° C., heating the mixture to a point just below its boiling point, maintaining its temperature approximately at such point for six to nine hours, adding to the reaction mixture so treated an alkali forming a soluble alkali metal salt of parahydroxy-metanitro-phenylarsenious acid, converting this soluble alkali metal salt into insoluble salt, and recovering parahydroxy-metanitro-phenylarsenious acid.

13. A process of the kind described which comprises mixing arsanilic acid, nitrous acid and nitric acid, causing diazotization to occur at a temperature below approximately 70° C., heating the mixture to a point just below its boiling point, maintaining its temperature approximately at such point for six to nine hours, adding sodium hydroxide to the reaction mixture while boiling, adding ethyl alcohol to the mixture so treated, separating orange red crystals of the sodium salt of parahydroxy-metanitro-phenylarsenious acid.

14. A process of the kind described which comprises treating parahydroxy-metanitro-phenylarsenious acid and one or more of the following impurities: orthonitrophenol, 2-4 dinitrophenol and traces of various colored and tarry substances, with an alkali, converting the parahydroxy-metanitro-phenylarsenious acid into a salt, and mechanically separating the salt from impurities.

15. A process of the kind described which comprises treating parahydroxy-metanitro-phenylarsenious acid and one or more of the following impurities: orthonitrophenol, 2-4 dinitrophenol and traces of various colored and tarry substances, with an alkali in solution, precipitating the salt of parahydroxy-metanitro-phenylarsenious acid as an insoluble precipitate, and filtering the salt to remove it from the solution containing the impurity.

16. A process of the kind described which comprises treating parahydroxy-metanitro-phenylarsenious acid and one or more of the following impurities: orthonitrophenol, hydroxyphenylarsenious acid, 2-4 dinitrophenol and traces of various colored and tarry substances, with sodium hydroxide in water solution, precipitating the sodium salt by ethyl alcohol, and recovering the sodium salt.

17. A process of the kind described which comprises treating parahydroxy-metanitro-phenylarsenious acid and one or more of the following impurities: orthonitrophenol, hydroxyphenylarsenious acid, 2-4 dinitrophenol and traces of various colored and tarry substances, with boiling alkali metal hydroxide, adding an alcohol in which the alkali metal salt of parahydroxy-metanitro-phenylarsenious acid is insoluble, and filtering the alkali metal salt of parahydroxy-metanitro-phenylarsenious acid which separates on standing.

Signed at New York, New York, this 21st day of July, 1922.

IWAN OSTROMISLENSKY.